No. 725,972. PATENTED APR. 21, 1903.
B. KOHN.
MACHINE FOR MEASURING RIBBON, &c.
APPLICATION FILED JAN. 2, 1902.
NO MODEL. 2 SHEETS—SHEET 1.
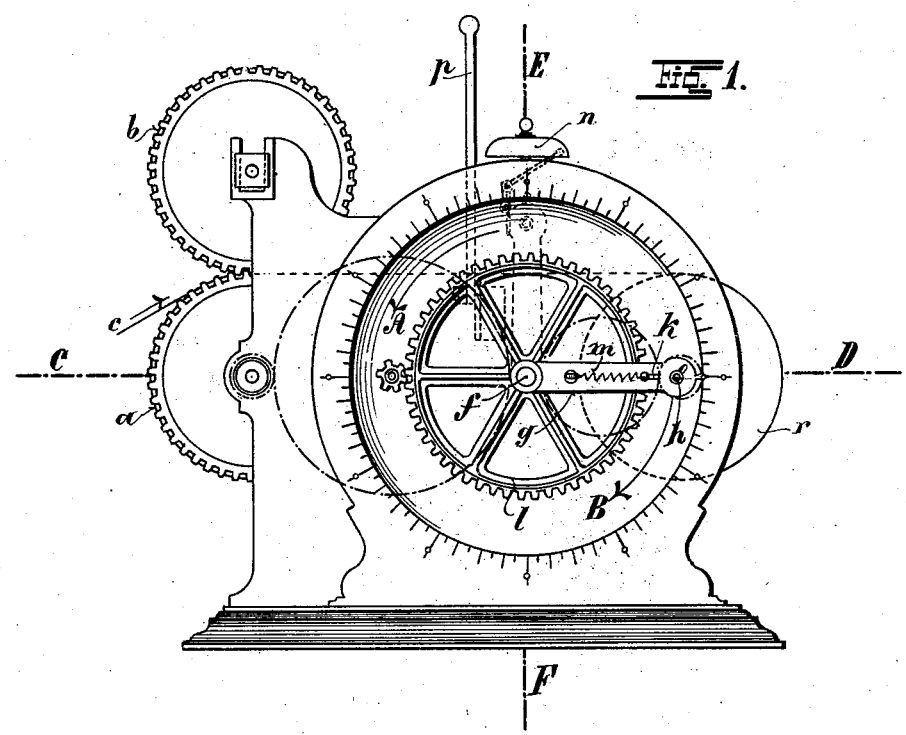
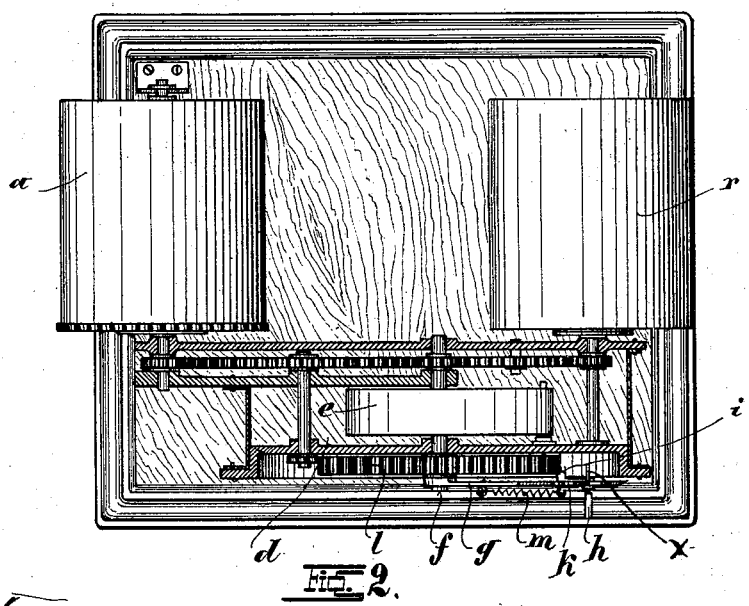

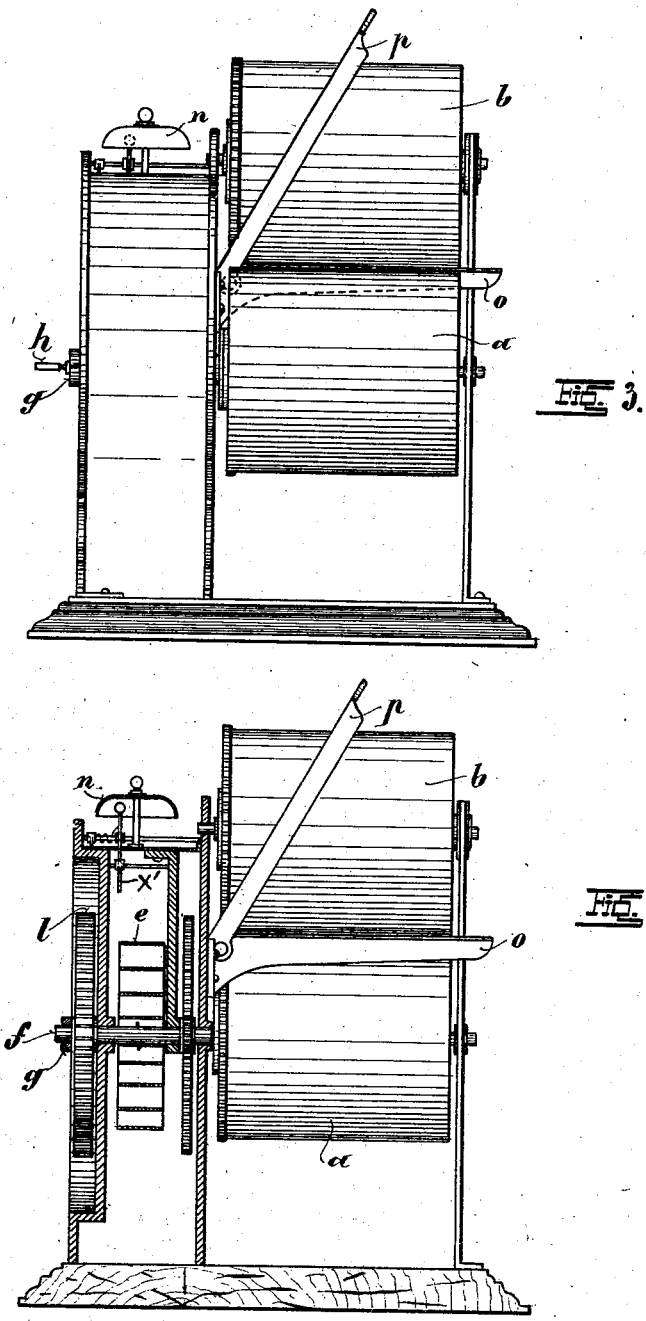

UNITED STATES PATENT OFFICE.

BRUNO KOHN, OF LEIPZIG, GERMANY.

MACHINE FOR MEASURING RIBBON, &c.

SPECIFICATION forming part of Letters Patent No. 725,972, dated April 21, 1903.

Application filed January 2, 1902. Serial No. 88,233. (No model.)

*To all whom it may concern:*

Be it known that I, BRUNO KOHN, merchant, of 16 Katharinenstrasse, Leipzig, in the German Empire, do hereby declare the nature of this invention and in what manner the same is to be performed to be particularly described and ascertained in and by the following statement.

This invention relates to a machine for measuring off ribbon and the like into lengths, which also enables the desired length of ribbon to be cut off and wound up ready for immediate delivery to a purchaser. The improved machine has also the further advantage that when it has been set to a determined measurement it does not require any special attention, so that the operator can attend to other matters.

With the present method of measuring off ribbon and the like with the aid of a yard-measure mistakes cannot be entirely avoided. In shops the shop assistant is compelled to give his or her whole attention to the measuring operation, and yet the purchaser has no certainty that he or she has received the correct length of material, nor is the assistant or the owner of the business certain that the desired length of ribbon has been measured off correctly.

The nature of the present invention will be clearly understood from the description of the accompanying drawings, in which—

Figure 1 is a front elevation. Fig. 2 is a sectional plan of the improved machine. Fig. 3 is an end elevation, and Fig. 4 a cross-section, of the machine.

The improved machine has two rollers $a$ $b$. The lower roller $a$ is mounted in fixed bearings, while the upper roller $b$ can be lifted or turned up to allow of the ribbon $c$ or the like goods which it is desired to measure being inserted between the two rollers $a$ and $b$. The roller $a$ is driven by clockwork $d$ in such a manner that the roller $a$ will make a determined number of revolutions corresponding to the length of ribbon which is to be measured off. The spring $e$ for driving the clockwork is fixed to an axle $f$, and a lever $g$ is mounted on the front end of this axle for winding up the spring $e$. The handle $h$ of the lever $g$ has fixed to it a pawl $i$ and can be moved for a small distance in a slot $k$.

Before the apparatus is used the lever $g$ is in its zero position, as indicated in dotted lines in Fig. 1.

In using the machine to measure off a determined length of ribbon the lever $g$ is set to the number on the scale, Fig. 1, indicating the said length—say, nine yards—but before the lever $g$ is turned for that purpose the handle $h$ is moved in the slot $k$, so as to move the pawl $i$ out of engagement with the teeth of the toothed wheel $l$. In this manner the connection between the lever $g$ and the clockwork is broken and the setting of the lever to the aforesaid number acts only to wind up the spring $e$. When the lever $g$ has been correctly set, the handle $h$ is released and is then pulled back by a spring $m$, so as to bring the pawl $i$ into engagement with the toothed wheel $l$. The spring $e$, which is now wound up, will now drive the clockwork to an extent sufficient to move the lever $g$ into its zero position. The lever $g$ is prevented by means of a stop or the like from moving beyond the zero position. The spring has still some force left in it when the lever $g$ is in the zero position. Each time the lever $g$ moves into its zero position it operates a bell $n$, and thus notifies the operator of the completion of the measuring of one length. The lever $g$ carries a projecting pin $x$, which strikes the arm $x'$ for ringing the bell. The ribbon has now to be cut by the operator. This is done by means of a scissors-like instrument, having its bottom blade $o$ fixed to the machine, while the top blade $p$ can be moved down from outside by means of a handle $q$.

$r$ is a drum or the like for winding up the length of ribbon which has been measured off. If this drum is made of exactly the same diameter as the roller $a$, these two parts may be connected together, preferably by means of an intermediate friction-disk. It must be taken into consideration that the effective diameter of the drum is increased by the ribbon wound on it.

The machine is operated as follows: The roller $b$ is raised or turned up and the ribbon $c$ is passed from the roll of ribbon over the roller $a$, through the cutting instrument $o$ $p$, to the highest part of the drum $r$, to which it is fixed or on which it is clipped fast by any convenient means. The roller $b$ is now turned down and the lever $g$ is set to the number indicating the determined length by being rotated in the direction indicated by the arrow A, Fig. 1. The machine is now left to itself until the bell $n$ sounds. Then the operator, with the aid of the scissors $o\ p$, cuts the ribbon and draws the measured length off the drum $r$.

Having now particularly described and ascertained the nature of my said invention and in what manner the same is to be performed, I declare that what I claim is—

A ribbon-measuring apparatus comprising a pair of rollers, a train of gearing for operating one of said rollers, a spring for imparting power to said gearing, a dial for indicating the measurements, a pointer-arm arranged to travel over said dial, and connections whereby the movement of the arm to a determined point on the dial winds up the spring a corresponding amount, substantially as described.

In witness whereof I hereunto set my hand in presence of two witnesses.

BRUNO KOHN.

Witnesses:
OSKAR EICHHOLZ,
RUDOLPH FRICKE.